United States Patent
Jeon et al.

(10) Patent No.: US 12,185,253 B2
(45) Date of Patent: Dec. 31, 2024

(54) ELECTRONIC DEVICE AND METHOD FOR ADJUSTING OUTPUT POWER OF RADIO FREQUENCY SIGNAL TO BE OUTPUT TO ANTENNA

(71) Applicant: Samsung Electronics Co., Ltd., Gyeonggi-do (KR)

(72) Inventors: Byunggil Jeon, Gyeonggi-do (KR); Jongbok Jang, Gyeonggi-do (KR); Eunsik Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 358 days.

(21) Appl. No.: 17/743,883

(22) Filed: May 13, 2022

(65) Prior Publication Data
US 2022/0369234 A1    Nov. 17, 2022

Related U.S. Application Data

(63) Continuation of application No. PCT/KR2022/003476, filed on Mar. 11, 2022.

(30) Foreign Application Priority Data

May 17, 2021    (KR) ........................ 10-2021-0063513

(51) Int. Cl.
*H04W 52/06* (2009.01)
*H04B 1/04* (2006.01)
(Continued)

(52) U.S. Cl.
CPC .............. *H04W 52/06* (2013.01); *H04B 1/04* (2013.01); *H04B 17/102* (2015.01); *H04B 17/13* (2015.01); *H04B 2001/0408* (2013.01)

(58) Field of Classification Search
CPC ........... H04W 52/06; H01Q 1/50; H04B 1/04; H04B 17/13; H04B 17/102
See application file for complete search history.

(56) References Cited

U.S. PATENT DOCUMENTS 9,769,769 B2 *    9/2017   Harper ................... H04B 7/022
2012/0270519 A1  10/2012   Ngai et al.
(Continued)

FOREIGN PATENT DOCUMENTS

JP    2013-255156    12/2013
JP    2015-162733     9/2015
(Continued)

OTHER PUBLICATIONS

International Search Report dated Jun. 9, 2022 issued in counterpart application No. PCT/KR2022/003476, 11 pages.

*Primary Examiner* — Myron Wyche
(74) *Attorney, Agent, or Firm* — The Farrell Law Firm, P.C.

(57) ABSTRACT

A method and electronic device are provided for adjusting an output power of an RF signal to be output to an antenna, based on a proximity of an object and a shape (or configuration) of the electronic device. The electronic device may include a proximity sensor, an antenna corresponding to the proximity sensor, a power amplifier corresponding to the antenna, and a processor configured to control the power amplifier to output a first RF signal having a first output power to the antenna, identify the antenna corresponding to the proximity sensor, based on proximity of an object being detected by the proximity sensor, identify, using a power table configured for the antenna, a second output power corresponding to a shape of the electronic device and the proximity of the object being detected, wherein the second output power is different from the first output power, and control the power amplifier to output a second RF signal having the second output power, to the antenna.

12 Claims, 5 Drawing Sheets

(51) Int. Cl.
*H04B 17/10* (2015.01)
*H04B 17/13* (2015.01)

(56) References Cited

U.S. PATENT DOCUMENTS

| | | |
|---|---|---|
| 2013/0210477 A1 | 8/2013 | Peter |
| 2013/0331046 A1 | 12/2013 | Hawaka et al. |
| 2018/0175944 A1 | 6/2018 | Seyed et al. |
| 2020/0195290 A1 | 6/2020 | Kwawand et al. |
| 2020/0195336 A1 | 6/2020 | Raghavan et al. |
| 2020/0205087 A1 | 6/2020 | Hong |
| 2020/0412459 A1 | 12/2020 | Seyed et al. |

FOREIGN PATENT DOCUMENTS

| | | |
|---|---|---|
| JP | 6312461 | 4/2018 |
| KR | 1020200085546 | 7/2002 |
| KR | 1020120087095 | 6/2012 |
| KR | 1020190030771 | 3/2019 |
| KR | 10-2021-0017157 | 2/2021 |
| KR | 1020210040192 | 4/2021 |

\* cited by examiner

< 401 >

< 402 >

| Antenna | Proximity of object | Shape | Output power | |
|---|---|---|---|---|
| First antenna | Proximity X | First shape | A dBm | |
| | | Second shape | | |
| | Proximity O | First shape | B dBm | 511b |
| | | Second shape | C dBm | 511c |
| Second antenna | Proximity X | First shape | D dBm | |
| | | Second shape | | |
| | Proximity O | First shape | E dBm | |
| | | Second shape | F dBm | 512b |
| Third antenna | Proximity X | First shape | G dBm | |
| | | Second shape | | |
| | Proximity O | First shape | H dBm | |
| | | Second shape | I dBm | |
| Fourth antenna | Proximity X | First shape | J dBm | |
| | | Second shape | | |
| | Proximity O | First shape | K dBm | |
| | | Second shape | L dBm | |

FIG.5

ELECTRONIC DEVICE AND METHOD FOR ADJUSTING OUTPUT POWER OF RADIO FREQUENCY SIGNAL TO BE OUTPUT TO ANTENNA

CROSS-REFERENCE TO RELATED APPLICATION(S)

This application is a bypass continuation application of International Application No. PCT/KR2022/003476, which was filed on Mar. 11, 2022, and is based on and claims priority under 35 U.S.C. § 119 to Korean Patent Application No. 10-2021-0063513, which was filed in the Korean Intellectual Property Office on May 17, 2021, the entire disclosure of each of which is incorporated herein by reference.

BACKGROUND

1. Field

The disclosure relates generally to a method and a device for adjusting output power of a radio frequency (RF) signal to be output to an antenna, based on a proximity of an object and a shape (or configuration) of an electronic device.

2. Description of Related Art

Electronic devices that transmit signals through an antenna to communicate with external devices are widely used. For example, an electronic device can transmit radio waves into a space using an emitter.

In wireless communication, electronic devices should satisfy specified regulatory requirements. For example, in the United States, specifications of maximum permissible exposure (MPE) have been established by the Federal Communications Commission (FCC). For a specific range of frequencies, power density (PD) may be used to express exposure intensity. PD is defined as power per unit area, e.g., in watts per square meter (W/m2), milliwatts per square centimeter (mW/cm2), or microwatts per square centimeter (μW/cm2).

In addition, many countries have enacted regulations relating to specific absorption rate (SAR), which is a measure of the rate at which electromagnetic waves are absorbed by a human body.

Since radio waves generated in wireless communication may negatively affect the human body, a need exists for limiting the degree of exposure to radio waves when a human body approaches an electronic device that transmits a wireless communication signal.

However, when the proximity of an object (e.g., a user's body part) is detected with respect to a plurality of antennas included in an electronic device, and a dynamic power reduction (DPR) operation uniformly backs off output power values of RF signals output to the plurality of antennas without considering the types of the antennas or a shape or a configuration of the electronic device, communication performance of the electronic device may deteriorate.

SUMMARY

The disclosure is designed to address at least the problems and/or disadvantages described above and to provide at least the advantages described below.

An aspect of the disclosure is to provide an electronic device that adjusts output power of an RF signal to be output to each antenna using a power table configured for each antenna, based on whether a proximity of an object is detected and a shape (or configuration) of the electronic device.

In accordance with an aspect of the disclosure, an electronic device is provided, which includes a proximity sensor, an antenna corresponding to the proximity sensor, a power amplifier corresponding to the antenna, and a processor configured to control the power amplifier to output a first RF signal having a first output power to the antenna, identify the antenna corresponding to the proximity sensor, based on proximity of an object being detected by the proximity sensor, identify, using a power table configured for the antenna, a second output power corresponding to a shape of the electronic device and the proximity of the object being detected, wherein the second output power is different from the first output power, and control the power amplifier to output a second RF signal having the second output power, to the antenna.

In accordance with another aspect of the disclosure, a method is provided for an electronic device including a proximity sensor, an antenna corresponding to the proximity sensor, and a power amplifier corresponding to the antenna. The method includes controlling the power amplifier to output a first radio frequency (RF) signal having a first output power to the antenna; identifying the antenna corresponding to the proximity sensor, based on a proximity of an object being detected by the proximity sensor; identifying, using a power table configured for the antenna, a second output power corresponding to a shape of the electronic device and the proximity of the object being detected, wherein the second output power is different from the first output power; and controlling the power amplifier to output a second RF signal having the second output power.

BRIEF DESCRIPTION OF DRAWINGS

The above and other aspects, features, and advantages of certain embodiments of the present disclosure will be more apparent from the following description taken in conjunction with the accompanying drawings, in which:

FIG. 5 illustrates a power table including information about output power configured for each antenna according to an embodiment.

DETAILED DESCRIPTION

Various embodiments of the disclosure will now be described in detail with reference to the accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure.

In addition, descriptions of well-known functions and constructions are omitted for clarity and conciseness.

Figure 1:
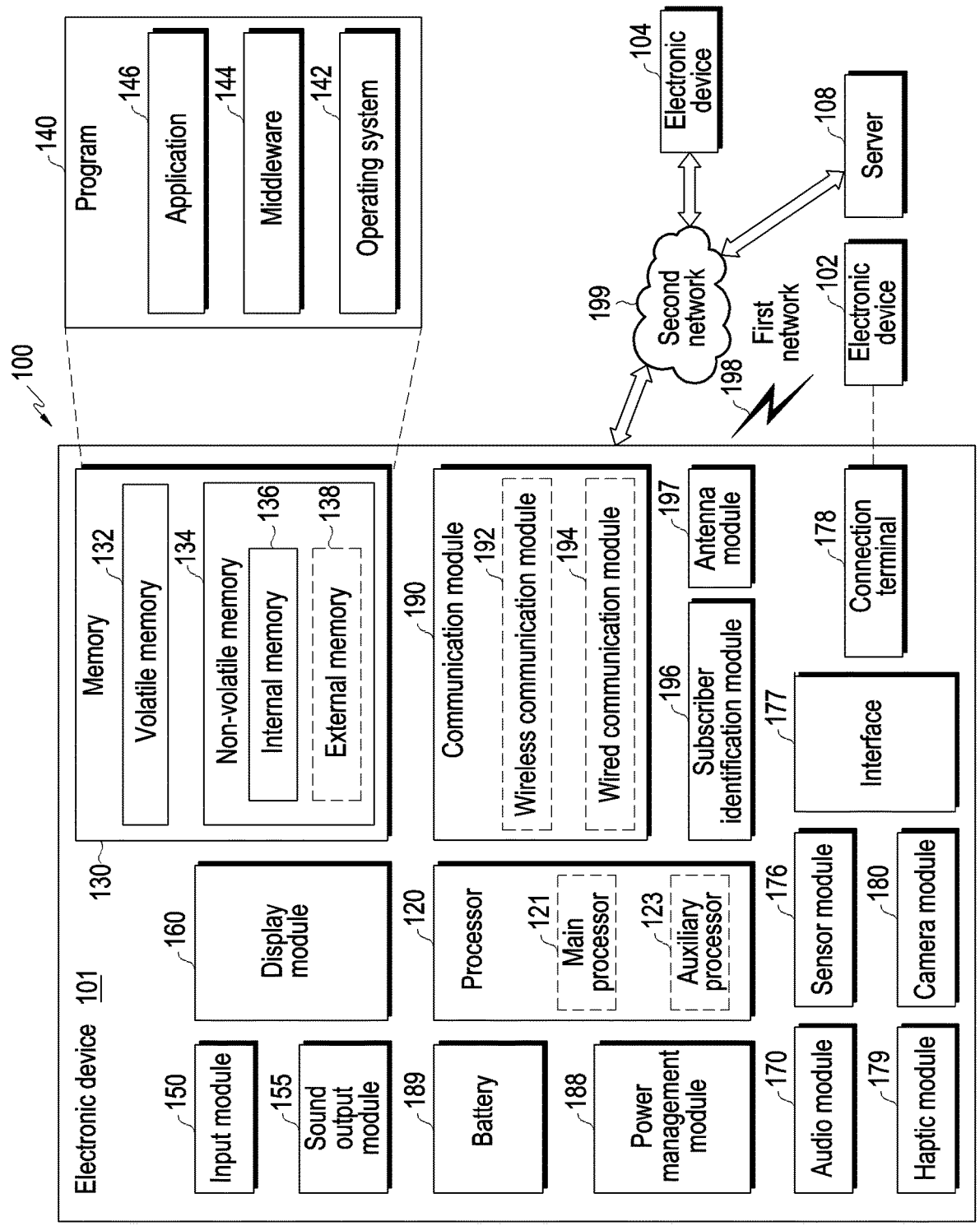
FIG. 1 illustrates an electronic device in a network environment according to an embodiment.

FIG. 1 illustrates an electronic device in a network environment according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence (AI) model processing. An AI model may be generated by machine learning. Such learning may be performed, e.g., by the electronic device 101 where the AI is performed or via a separate server (e.g., the server 108). Learning algorithms may include, but are not limited to, e.g., supervised learning, unsupervised learning, semi-supervised learning, or reinforcement learning. The AI model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more thereof but is not limited thereto. The AI model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a hall sensor, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly, According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a legacy cellular network, a 5th generation (5G) network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., an RF integrated circuit (RFIC)) other than the radiating element may be additionally formed as part of the antenna module 197.

According to various embodiments, the antenna module 197 may for a mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
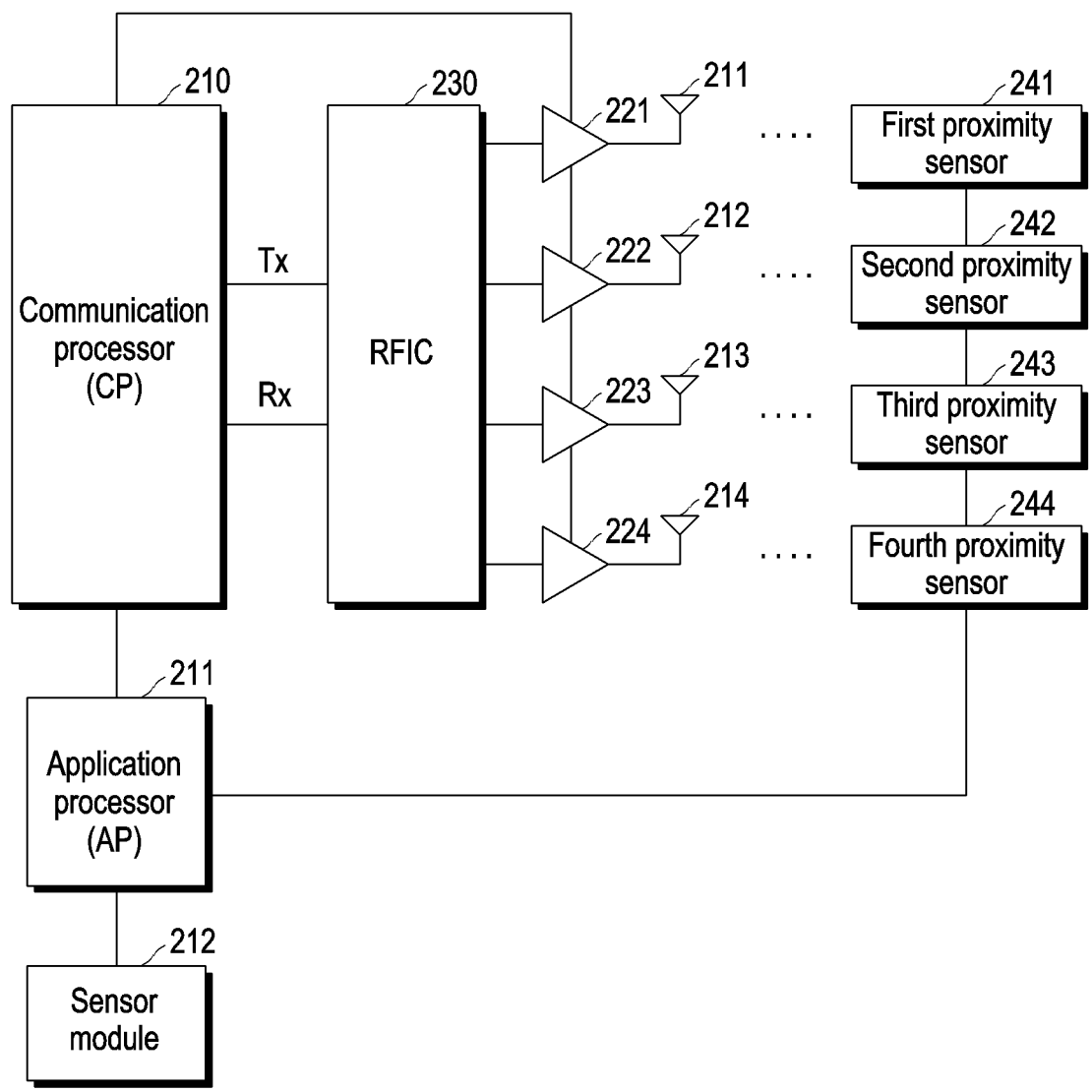
FIG. 2 illustrates an electronic device that supports network communication according to an embodiment.

FIG. 2 illustrates an electronic device that supports network communication according to an embodiment.

Referring to FIG. 2, the electronic device includes a CP 210, an RFIC 230, power amplifiers 221, 222, 223, and 224, and antenna modules 211, 212, 213, and 214. The CP 210, the RFIC 230, and the power amplifiers 221, 222, 223, and 224 may form at least part of a wireless communication module.

The electronic device further includes an AP 211, a sensor module 212, and proximity sensors 241, 242, 243, and 244. Alternatively, the electronic device may further include additional components.

The CP 210 may provide a baseband signal for transmission Tx to the RFIC 230, and may receive a baseband signal for reception Rx from the RFIC 230 and may process the received baseband signal.

For transmission, the RFIC 230 may convert a baseband signal generated by the CP 210 into an RF signal in a band used for an external network.

For reception, an RF signal may be obtained from the external network through at least one of the antenna modules 211, 212, 213, and 214 and may be preprocessed through an RF front end (RFFE). The RFIC 230 may convert the preprocessed RF signal into a baseband signal to be processed by the CP 210. The RFIC 230 may generate an RF signal corresponding to the baseband signal for transmission Tx and may provide the generated baseband signal to at least one of the power amplifiers 221, 222, 223, and 224.

Although FIG. 2 illustrates a baseband signal for transmission Tx being provided to the RFIC 230 through a single line for ease of illustration, it will be understood by those skilled in the art that a baseband signal of an in-phase (I) component and a quadrature (Q) component may be provided to the RFIC 230.

Further, although FIG. 2 illustrates only one RFIC 230 in the electronic device, a plurality of RFICs may be included in the electronic device.

The antenna modules 211, 212, 213, and 214 may be configured in various forms in order to transmit and receive RF signals in a plurality of bands used in the external network. For example, the first antenna module 211 may transmit and receive an RF signal in a low band used in a cellular network (e.g., a long-term evolution (LTE) network), the second antenna module 212 may transmit and receive an RF signal in a sub-6 band (e.g., about 6 GHz or less) used in a cellular network (e.g., a 5G network), the third antenna module 213 may transmit and receive an RF signal in a 5G above-6 band (e.g., about 6 GHz to about 60 GHz) used in a cellular network (e.g., a 5G network), and the fourth antenna module 214 may transmit and receive an RF signal in a middle band and a high band used in a cellular network (e.g., the LTE network).

Additionally, although FIG. 2 illustrates the four antenna modules 211, 212, 213, and 214 as being included in the electronic device 101, the number of antenna modules included in the electronic device is not limited thereto.

The power amplifiers 221, 222, 223, and 224 may receive a supply voltage Vcc and may amplify an RF signal, provided from the RFIC 230, using the supply voltage Vcc so that the RF signal has specific output power, based on control of the CP 210. The power amplifiers 221, 222, 223, and 224 may transmit an RF signal having specific output power to the electrically connected antenna modules 211, 212, 213, and 214, respectively. That is, the first power amplifier 221 may provide an RE signal having first specific output power to the first antenna module 211, the second power amplifier 222 may provide an RF signal having second specific output power to the second antenna module 212, the third power amplifier 223 may provide an RF signal having third specific output power to the third antenna module 213, and the fourth power amplifier 224 may provide an RF signal having fourth specific output power to the fourth antenna module 214. The power amplifiers 221, 222, 223, and 224 may adjust the level of output power of an RF signal to be transmitted to the antenna modules 211, 212, 213, and 214, based on control of the CP 210. The power amplifiers 221, 222, 223, and 224 may be included in the RFFE. The RFFE may be configured as a power amplifier module (PAM), a front end module (FEM), a PAM including a duplexer (PAMiD), an low noise amplifier (LNA) and PAM with an integrated duplexer or diplexer (LPAMID), or a power amplifier with an integrated LNA and filter (LPAMIF), but is not limited in configuration form.

Although FIG. 2 illustrates the power amplifiers 221, 222, 223, and 224 as being connected to the RFIC 230, a filter and/or an antenna switching module (ASM) may be included therebetween.

Further, although FIG. 2 illustrates the four power amplifiers 221, 222, 223, and 224, the number of power amplifiers included in the electronic device is not limited thereto.

The proximity sensors 241, 242, 243, and 244 may detect a capacitance value that is changed by the proximity of an object and may provide the detected capacitance value to the AP 211. The proximity sensors 241, 242, 243, and 244 may be physically disposed adjacent to the antenna modules 211, 212, 213, and 214. That is, the first proximity sensor 241 may be disposed adjacent to the first antenna module 211, the second proximity sensor 242 may be disposed adjacent to the second antenna module 212, the third proximity sensor 243 may be disposed adjacent to the third antenna module 213, and the fourth proximity sensor 244 may be disposed adjacent to the fourth antenna, module 214.

Although FIG. 2 illustrates the four proximity sensors 241, 242, 243, and 244, the number of proximity sensors included in the electronic device is not limited thereto.

Figure 3:
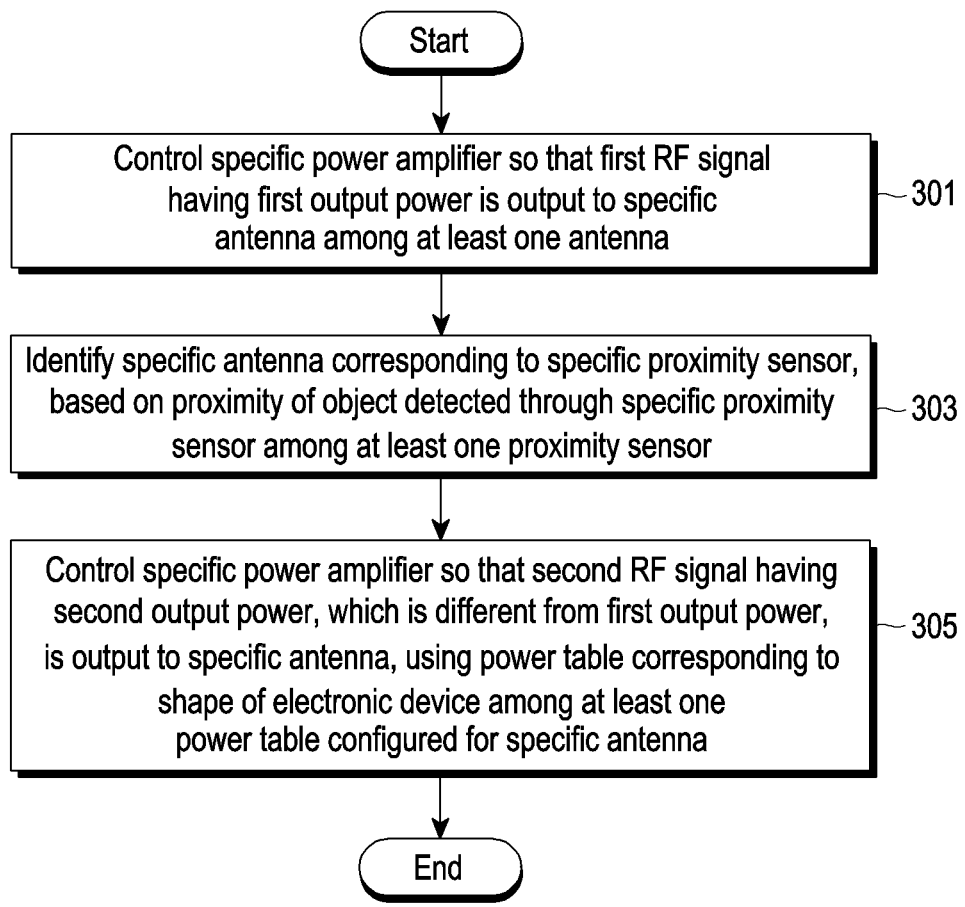
FIG. 3 is a flowchart illustrating a method of an electronic device for adjusting output power of an RF signal to be output to an antenna, based on whether a proximity of an object is detected and a shape of the electronic device, according to an embodiment.

FIG. 3 is a flowchart illustrating a method performed by an electronic device to adjust output power of an RF signal to be output to an antenna, based on whether a proximity of an object is detected and a shape of the electronic device, according to various embodiments Referring to FIG. 3, in step 301, the electronic device (e.g., a processor therein) controls a power amplifier to output a first RF signal having first output power to an antenna.

For example, referring to the electronic device illustrated in FIG. 2, the electronic device (e.g., the CP 210) may control at least one of the power amplifiers 221, 222, 223, and 224 so that an RF signal having a predetermined output power is output to at least one of the antenna modules 211, 212, 213, or 214, based on not detecting proximity of an object with respect to the at least one of the antenna modules 211, 212, 213, or 214. That is, a CP 210 may control the first power amplifier 221 to output an RF signal having a first output power to the first antenna module 211, based on not detecting the proximity of an object with respect to the first antenna module 211. Likewise, the electronic device may control the second power amplifier 222 to the fourth power amplifier 224 so that RF signals having predetermined output power are respectively output to the second antenna module 212 to the fourth antenna module 214, based on not detecting the proximity of an object with respect to the second antenna module 212 to the fourth antenna module 214.

The electronic device may store, in a memory, a power table configured for the antennas included in the electronic device.

FIG. 5 illustrates a power table including information about output power configured for each antenna according to an embodiment. For example, FIG. 5 will be described using the electronic device of FIG. 2.

Referring to FIG. 5, the electronic device may store, in a memory, a power table 510 including information about output power of an RF signal to be output by each of the antenna modules 211, 212, 213, and 214, based on proximity of an object and a shape (or configuration) of the electronic device. The electronic device may control a power amplifier so that an RF signal having predetermined output power determined according to the power table 510 is output to the antenna, based on not detecting the proximity of an object with respect to the antenna. At least some of output power values in the power table 510 configured for the antennas may be different or the same, and the output power values may be configured by a manufacturer of the electronic device and may be stored in advance in the memory.

Referring again to FIG. 3, in step 303, the electronic device identifies an antenna corresponding to a proximity sensor, based on the proximity of an object detected by the proximity sensor.

For example, referring to the electronic device in FIG. 2, the AP 211 may identify capacitance values of the proximity sensors 241, 242, 243, and 244, based on sensor data provided from the proximity sensors 241, 242, 243, and 244, and may determine the degree of proximity of an object (e.g., a user) to the proximity sensors 241, 242, 243 and 244 according to changes in the capacitance values. The electronic device may determine proximity of the object to at least one of the proximity sensors 241, 242, 243, and 244, based on the capacitance value of the at least one the proximity sensors 241, 242, 243, and 244 exceeding a threshold value.

Based on detecting the proximity of the object to the at least one of the proximity sensors 241, 242, 243, and 244, the AP 211 may provide information indicating the proximity sensor detecting the object or information indicating an antenna module corresponding to the proximity sensor to the CP 210. For example, the AP 211 may provide information indicating the first proximity sensor 241 or information indicating the first antenna module 211 corresponding to the first proximity sensor 241 to the CP 210, based on detecting proximity of an object through the first proximity sensor 241. The CP 210 may identify an antenna module corresponding to a proximity sensor detecting the proximity of an object, based on information provided from the AP 211. The CP 210 may be electrically connected to the proximity sensors 241, 242, 243, and 244, and may identify an antenna module (or antenna modules) corresponding to the proximity sensor(s) detecting proximity of an object, based on sensor data directly provided from the proximity sensors 241, 242, 243, and 244.

Figure 4:
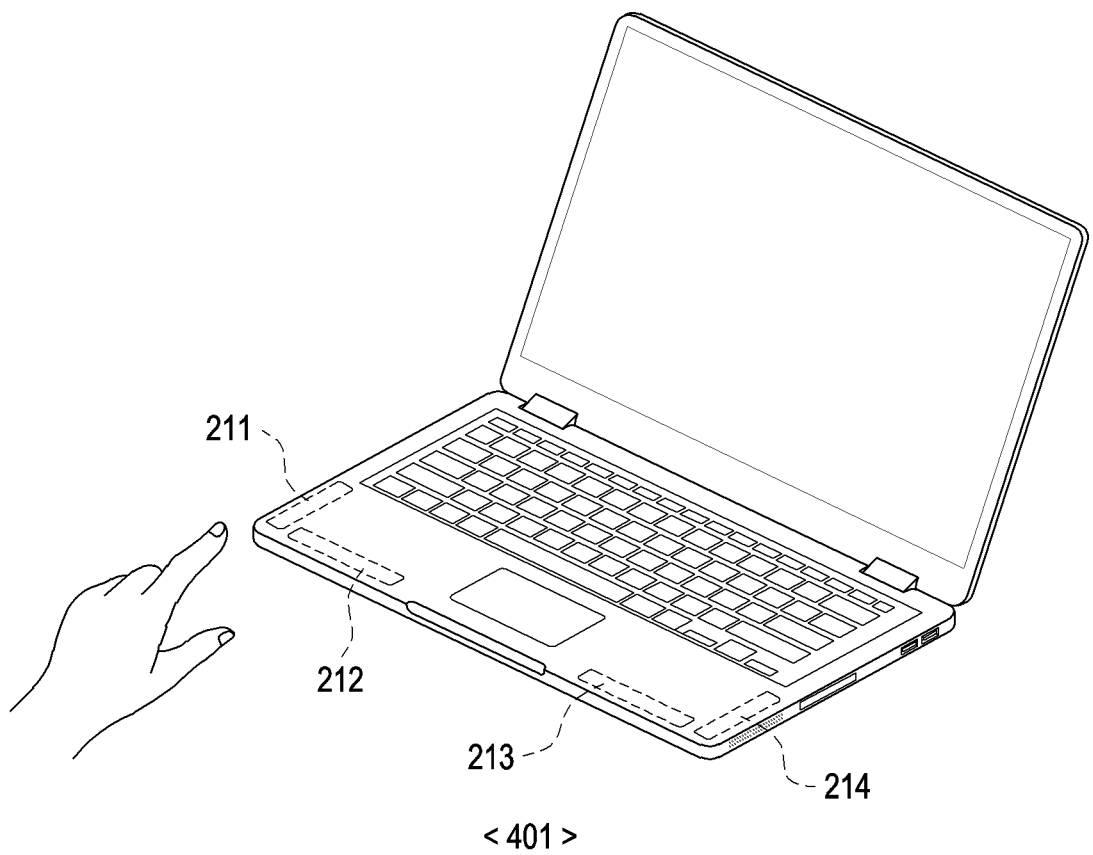
FIG. 4 illustrates shapes of an electronic device according to an embodiment.
Figure 4:
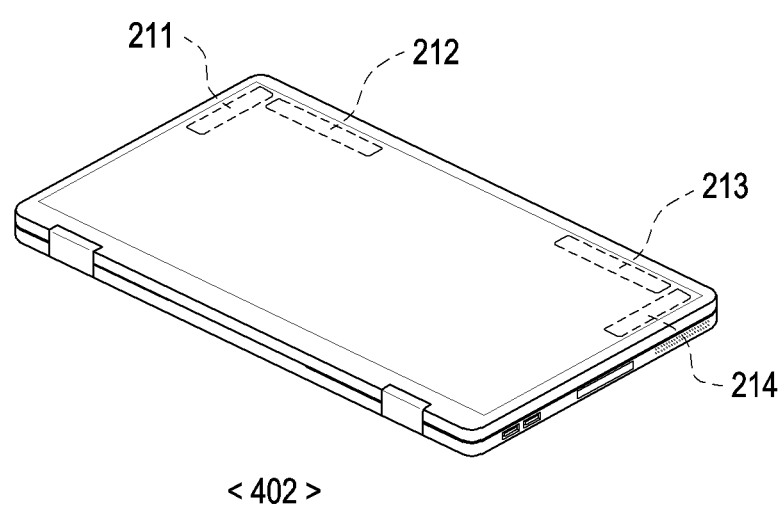

FIG. 4 illustrates shapes of an electronic device according to an embodiment. For example, FIG. 4 will be described with reference to the electronic device of FIG. 2.

Referring to FIG. 4, in shape (or configuration) 401, when an object (e.g., a user's hand) approaches the first antenna module 211, the CP 210 may detect proximity of the object through the first proximity sensor 241 disposed adjacent to the first antenna module 211 and may identify the first antenna module 211 corresponding to the first proximity sensor 241 having detected the proximity of the object.

Referring again to FIG. 3, in step 305, the electronic device controls the power amplifier so that a second RF signal having second output power, which is different from the first output power, is output to the antenna, using a power table configured for the antenna, based on the shape of the electronic device. The electronic device may identify its shape (or configuration) using a sensor module.

Referring again to FIG. 4, using the sensor module 212, the electronic device may identify that it is currently in a first shape 401 (e.g., a clamshell state) or in a second shape 402 (e.g., a tablet state). The electronic device may identify whether it is in the first shape 401 or the second shape 402 using a plurality of hall sensors included in the 212.

Although FIG. 4 illustrates the electronic device as being foldable at hinge area, e.g., like a laptop computer, the electronic device may be embodied in various shapes, and as such, a power table may include different values for each of the various shapes.

The electronic device may store, in a memory, a power table configured for the antenna modules 211, 212, 213, and 214, based on information indicating whether proximity of an object is detected and information indicating a shape of the electronic device. The AP 211 may provide information indicating the shape of the electronic device to the CP 210, based on identifying the shape of the electronic device using the sensor module 212.

The electronic device 101 may determine output power of an RF signal to be output by an antenna, based on a power table, corresponding to a shape of the electronic device configured for the antenna.

More specifically, the electronic device may identify, in a power table, output powers configured for an antenna corresponding to a proximity sensor that has detected the proximity of the object. The CP 210 may obtain first information indicating the antenna corresponding to the proximity sensor that has detected the proximity of the object and second information indicating a shape of the electronic device from the AP 211, and then may determine an output power of an RF signal to be output by the antenna from the power table, based on the proximity of the object being detected and the shape of the electronic device.

Referring again to FIGS. 4 and 5, when the electronic device is in the first shape 401 and the object (e.g., the user's hand) approaches the first antenna module 211, the electronic device may identify the first antenna module 211 in response to the first proximity sensor 241 detecting the proximity of the object, and may determine an output power (e.g., B dBm 511$b$) of an RF signal to be output by the first antenna module 211, corresponding to the first shape 401 of the electronic device, from among power outputs 511 configured for the first antenna module 211.

As another example, when the electronic device is in the second shape 402 and the object approaches the first antenna module 211, the electronic device may determine an output power (e.g., C dBm 511$c$) of an RF signal to be output by the first antenna module 211, corresponding to the second shape 402 of the electronic device, among the power outputs 511 configured for the first antenna module 211.

With respect to the first antenna module 211, a first output power (e.g., A dBm) 511$a$ may be used when the proximity of an object is not detected and the electronic device is in either the first or second shape, a second output power (e.g., B dBm) 511$b$ may be used when the proximity of an object is detected and the electronic device is in the first shape, and a third output power (e.g., C dBm) 511$c$ may be used when the proximity of an object is detected and the electronic device is in the second shape. The first output power 511$a$ may be the highest value.

As another example, when the electronic device is in the first shape 401 and the object approaches the first antenna module 211 while a first RF signal having the first output power (e.g., A dBm) 511$a$ is output to the first antenna module 211, the electronic device may determine the second output power (e.g., B dBm) 511$b$ from the power outputs 511 configured for the first antenna module 211, based on the first proximity sensor 241 detecting the proximity of the object and the first shape 401 of the electronic device, and may control the first power amplifier 221 so that a second RF signal having the second output power (e.g., B dBm) 511$b$, which is lower than the first output power (e.g., A dBm) 511$a$, is output to the first antenna module 211.

As another example, when the electronic device is in the second shape 402 and an object approaches the second antenna module 212 while a first RF signal having a fourth output power (e.g., D dBm) 512$a$ among power outputs 512 configured for the second antenna module 212 is output to the second antenna module 212, the electronic device may determine a fifth output power (e.g., F dBm) 512$b$ from the power outputs 512 configured for the second antenna module 212, based on the second proximity sensor 242 detecting proximity of the object and the second shape 402 of the electronic device, and may control the second power amplifier 222 so that a second RF signal having the fifth output power (e.g., F dBm) 512$b$, which is lower than the fourth output power (e.g., D dBm) 512$a$, is output to the second antenna module 212.

An electronic device according to an embodiment may be one of various types of electronic devices. An electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

It is to be understood that a singular form of a noun corresponding to an item may include one or more of the things, unless the relevant context clearly indicates otherwise.

As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order).

It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, an electronic device may include at least one proximity sensor, at least one antenna, at least one power amplifier, and a processor operatively connected to the at least one proximity sensor, the at least one antenna, and the at least one power amplifier, wherein the processor may be configured to control a specific power amplifier corresponding to a specific antenna among the at least one power amplifier so that a first RF signal having first output power is output to the specific antenna among the at least one antenna, identify the specific antenna corresponding to a specific proximity sensor, based on proximity of an object detected through the specific proximity sensor among the at least one proximity sensor, and control the specific power amplifier so that a second RF signal having second output power, which is different from the first output power, is output to the specific antenna, using a power table corresponding to a shape of the electronic device among at least one power table configured for the specific antenna.

The second output power may be lower than the first output power.

The processor may be configured to control the specific power amplifier so that the first RF signal having the first output power determined according to the at least one power table is output to the specific antenna, based on not detecting the proximity of the object The electronic device may further include a memory, wherein the processor may be further configured to control the memory to store a plurality of power tables configured for each of the at least one antenna.

The processor may be further configured to identify the at least one power table configured for the specific antenna corresponding to the specific proximity sensor, based on detecting the proximity of the object through the specific proximity sensor, and select the power table corresponding to the shape of the electronic device from among the at least one power table.

The processor may correspond to an AP, and the AP may be further configured to determine whether a capacitance value of the specific proximity sensor exceeds a threshold value, based on sensor data provided from the specific proximity sensor, determine that the proximity of the object to the specific proximity sensor is detected, based on the capacitance value exceeding the threshold value, and provide first information indicating the specific proximity sensor detecting the proximity of the object or the specific antenna corresponding to the specific proximity sensor to a CP.

The electronic device may further include a sensor module, wherein the AP may be configured to identify the shape of the electronic device using the sensor module, and provide second information indicating the shape of the electronic device to the CP.

The CP may be configured to determine the second output power of the second RF signal to be output by the specific antenna from the power table selected based on the first information and the second information obtained from the AP, and control the specific power amplifier so that the second RF signal having the second output power is output to the specific antenna.

The processor may be further configured to control the specific power amplifier so that the second RF signal having first specific output power as the second output power is output to the specific antenna, using a first power table corresponding to a first shape of the electronic device among the at least one power table, based on the shape of the electronic device being the first shape, and control the specific power amplifier so that the second RF signal having second specific output power as the second output power is output to the specific antenna, using a second power table corresponding to a second shape of the electronic device among the at least one power table, based on the shape of the electronic device being the second shape, which is different from the first shape, the first shape may be a clamshell shape, and the second shape may be a tablet shape.

The first specific output power and the second specific output power may be different.

According to an embodiment, a method performed by an electronic device may include controlling a specific power amplifier corresponding to a specific antenna among at least one power amplifier of the electronic device so that a first RF signal having first output power is output to the specific antenna among at least one antenna of the electronic device, identifying the specific antenna corresponding to a specific proximity sensor, based on proximity of an object detected through the specific proximity sensor among at least one proximity sensor of the electronic device, and controlling the specific power amplifier so that a second RF signal having second output power, which is different from the first output power, is output to the specific antenna, using a power table corresponding to a shape of the electronic device among at least one power table configured for the specific antenna.

The controlling of the specific power amplifier so that the first RF signal is output to the specific antenna may include controlling the specific power amplifier so that the first RF signal having the first output power determined according to the at least one power table is output to the specific antenna, based on not detecting the proximity of the object.

The operating method of the electronic device may further include controlling a memory of the electronic device to store a plurality of power tables configured for each of the at least one antenna.

The operating method of the electronic device may further include identifying the at least one power table configured for the specific antenna corresponding to the specific proximity sensor, based on detecting the proximity of the object through the specific proximity sensor, and selecting the power table corresponding to the shape of the electronic device from among the at least one power table.

The operating method of the electronic device may further include determining, by an AP of the electronic device, whether a capacitance value of the specific proximity sensor exceeds a threshold value, based on sensor data provided from the specific proximity sensor, determining, by the AP, that the proximity of the object to the specific proximity sensor is detected, based on the capacitance value exceeding the threshold value, and providing, by the AP, first information indicating the specific proximity sensor detecting the proximity of the object or the specific antenna corresponding to the specific proximity sensor to a CP.

The operating method of the electronic device may further include identifying, by the AP, the shape of the electronic device using a sensor module of the electronic device, and providing, by the AP, second information indicating the shape of the electronic device to the CP.

The operating method of the electronic device may further include determining, by the CP, the second output power of the second RF signal to be output by the specific antenna from the power table selected based on the first information and the second information obtained from the AP.

The operating method of the electronic device may further include controlling the specific power amplifier so that the second RF signal having first specific output power as the second output power is output to the specific antenna, using a first power table corresponding to a first shape of the electronic device among the at least one power table, based on the shape of the electronic device being the first shape, and controlling the specific power amplifier so that the second RF signal having second specific output power as the second output power is output to the specific antenna, using a second power table corresponding to a second shape of the electronic device among the at least one power table, based on the shape of the electronic device being the second shape, which is different from the first shape, wherein the first shape may be a clamshell shape, and the second shape may be a tablet shape.

According to above-described embodiments, an output power of an RF signal to be output to an antenna detecting proximity of an object may be adjusted using a power table configured for the antenna according to whether proximity of an object is detected and a shape of an electronic device, thereby improving communication performance of the electronic device.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
   a proximity sensor;
   an antenna corresponding to the proximity sensor;
   a power amplifier corresponding to the antenna;
   a processor; and
   memory storing instructions, which when executed by the processor, cause the electronic device to:
   control the power amplifier to output a first radio frequency (RF) signal having a first output power to the antenna while proximity of an object is not detected and a shape of the electronic device is a first shape or a second shape, wherein the antenna is configured to output the RF signal with the first output power when the shape of the electronic device is the first shape or the second shape,
   identify the antenna corresponding to the proximity sensor and the shape of the electronic device, based on the proximity of the object being detected by the proximity sensor,
   identify, using a power table configured for the antenna, a second output power corresponding to the first shape of the electronic device and a third output power corresponding to the second shape of the electronic device, wherein the first output power is maximum output power among the first output power, the second output power and the third output power, and
   control the power amplifier to output a second RF signal having the second output power or the third output power according to the shape of the electronic device when the proximity of the object is detected, to the antenna.

2. The electronic device of claim 1, wherein the instructions, when executed by the processor, cause the electronic device to identify, using the power table configured for the antenna, the first output power based the proximity of the object not being detected.

3. The electronic device of claim 1, further comprising a communication processor (CP),
   wherein the processor comprises an application processor (AP), and
   wherein the AP is configured to:
   determine whether a capacitance value of the proximity sensor exceeds a threshold value, based on sensor data provided from the proximity sensor,
   determine that the proximity of the object is detected, based on the capacitance value exceeding the threshold value, and
   provide, to the CP, first information indicating the proximity sensor detecting the proximity of the object or the antenna corresponding to the specific proximity sensor.

4. The electronic device of claim 3, further comprising a sensor module,
   wherein the AP is further configured to:
   identify the shape of the electronic device using the sensor module, and
   provide second information indicating the shape of the electronic device to the CP.

5. The electronic device of claim 4, wherein the CP is configured to:
   determine, using the power table, the second output power of the second RF signal to be output by the antenna, based on the first information and the second information obtained from the AP, and
   control the power amplifier to output the second RF signal having the second output power to the antenna.

6. The electronic device of claim 1,
   wherein the first shape is a clamshell shape, and
   wherein the second shape is a tablet shape.

7. A non-transitory computer-readable recording medium storing a program executed on an electronic device, wherein the program comprises executable instructions that, when executed by a processor of the electronic device, cause the processor to:
   control a power amplifier of the electronic device to output a first radio frequency (RF) signal having a first output power to an antenna of the electronic device while proximity of an object is not detected and a shape of the electronic device is a first shape or a second shape, wherein the antenna is configured to output the RF signal with the first output power when the shape of the electronic device is the first shape or the second shape;

identify the antenna corresponding to a proximity sensor of the electronic device and the shape of the electronic device, based on the proximity of an object being detected by the proximity sensor;

identify, using a power table configured for the antenna, a second output power corresponding to the first shape of the electronic device and a third output power corresponding to the second shape of the electronic device, wherein the first output power is maximum output power among the first output power, the second output power and the third output power; and control the power amplifier to output a second RF signal having the second output power or the third output power according to the shape of the electronic device when the proximity of the object is detected.

8. The non-transitory computer-readable recording medium of claim 7, wherein the program comprises executable instructions, when executed by a processor of the electronic device, cause the processor to identify the first output power using the power table, based on not detecting the proximity of the object.

9. The non-transitory computer-readable recording medium of claim 7, wherein the program comprises executable instructions, when executed by a processor of the electronic device, cause the processor to:

determine, by an application processor (AP) of the electronic device, whether a capacitance value of the proximity sensor exceeds a threshold value, based on sensor data provided from the proximity sensor;

determine, by the AP, that the proximity of the object is detected, based on the capacitance value exceeding the threshold value; and provide, by the AP, to a communication processor (CP), first information indicating the proximity sensor detecting the proximity of the object or the antenna corresponding to the proximity sensor.

10. The non-transitory computer-readable recording medium of claim 9, wherein the program comprises executable instructions, when executed by a processor of the electronic device, cause the processor to:

identify, by the AP, the shape of the electronic device using a sensor module of the electronic device; and provide, by the AP, to the CP, second information indicating the shape of the electronic device.

11. The non-transitory computer-readable recording medium of claim 10, wherein the program comprises executable instructions, when executed by a processor of the electronic device, cause the processor to determine, by the CP, the second output power from the power table, based on the first information and the second information obtained from the AP.

12. The non-transitory computer-readable recording medium of claim 7, wherein the first shape is a clamshell shape, and the second shape is a tablet shape.

* * * * *